Feb. 16, 1954     R. O. LINCK     2,669,211

SURFACE MARKING SIGNAL

Filed May 26, 1952

Inventor
Robert O. Linck
By Beale and Jones
Attorneys

Patented Feb. 16, 1954

2,669,211

UNITED STATES PATENT OFFICE 2,669,211

SURFACE MARKING SIGNAL

Robert O. Linck, San Juan, P. R.

Application May 26, 1952, Serial No. 290,107

10 Claims. (Cl. 116—26)

This invention relates to a drop type of signal which when dropped from an aircraft bursts on impact with a surface and provides for marking of a continuous, homogeneous visible spot on the surface, in a time interval approaching that minimum time required for free fall from the same altitude.

During World War II a signal bomb of molded composition, approximately ten inches in length with a standard four vane tail such as disclosed in the U. S. Patent 2,338,719, issued January 11, 1944, was used primarily from airplanes as a drift indicator. The bomb was of conventional tear drop shape and its characteristics, as explained in the referred to patent, called for it breaking on striking the water when dropped from a height of 100 feet above the water. The speeds of the aircraft from which it was dropped were relatively high such as 100 miles per hour and upwards.

In connection with sonar submarine detection work which has progressed since World War II, it has been found that the use of such prior drop signals as disclosed in the referred to U. S. Patent 2,338,719 are not satisfactory as it has been found that failures to burst upon impact run from 30 to 40% when dropped from slow moving and low flying airships which have more recently been adopted as one of the principal detecting units in the sonar system.

The surface marking signal according to my invention is particularly useful in drops from slow moving aircraft such as made at zero speed as when they are turning into the wind and from altitudes of 50 to 75 feet and even as low as 15 feet above the surface on which the surface marking is to be made. The reasons for the failures of the prior art type of drop signal are that operations are now being conducted at heights of from 50 to 75 feet and even less. The speeds of the aircraft from which the signals are dropped are almost zero as would occur when airships are turning into the wind and which require dropping of the signal at such an instant. The surface marking signal of the prior art which uses a shell or casing having a round conventional tear drop formation produces too much strength to assure fracturability under operating conditions of slow speed and low altitude as now exist. In the prior art the drop signals were provided with fins to assist them in reaching a desired spot on the surface below, however, such tail fins are not necessary in drop bombs dropped from relatively low altitudes. As it is desirable that the drop signal take up the least amount of space and since the tail fins are not essential for dropping from low altitude at slow speeds they may be omitted without any reduction in effectiveness. Great accuracy at low altitude dropping is of secondary importance, while the prime factor is fracturability of the drop signal on impact with the surface below when the signal is dropped from an airship flying at low altitude such as from 15 to 75 feet and at slow speeds and even zero speed.

An object of my invention is to provide a surface marking signal which when dropped from slow moving aircraft at relatively low altitudes will fall in a time interval approaching that minimum time required for free fall from the same altitude and will burst on striking the surface below and will leave a mark of a continuous, homogeneous and visible spot on the surface and yet will withstand breakage in ordinary handling and transporting.

A further object of my invention is to provide a surface marking signal which is of relatively small size such as the order of seven inches long and three and a quarter inches of maximum width which is elongated in shape and has a plurality of flat surfaces which enhance its bursting ability when dropped from low altitudes.

A further object of my invention is to provide an elongated surface marking signal including a casing having parallel flat ends and a plurality of angularly disposed flat sides and containing marking powder to such a degree that a void space is provided between the powder and the casing so that it will not be deformed or fractured due to changes in pressure such as will obtain in an aircraft as the result of sudden changes in altitude.

A still further object of my invention is to provide a relatively small surface marking signal which may be readily handled without breakage but will burst when dropped from low altitudes at slow speeds and is molded of inorganic plastic composition providing smooth inner flat surfaces against which the marking powder contained therein is not packed or adhered but is freely slidable thereover.

Another object of my invention is to provide a surface marking signal adapted to be dropped from low or high altitudes at low or high speeds and which has an elongated casing with one end portion having a shape of a frustum of a regular pyramid having its sides diverging outwardly from each other as they extend from a flat end thereon toward the other end of the casing and the front remaining portion of the casing has a shape of a frustum of a regular pyramid having its sides converging toward an adjacent end which is apertured to receive the marking powder therethrough and which aperture is covered with a porous material permitting passage of air therethrough but impervious to the passage of the marking powder contained within the signal.

Still further objects and the entire scope of applicability of the present invention will become apparent from the detailed description given hereinafter; it should be understood, however, that the detailed description and specific example is given by way of illustration only, and while indicating the preferred embodiment of the invention, is not given by way of limitation, since various changes and modifications within the spirit and scope of the invention will become apparent to those skilled in the art from this detailed description.

One form of this invention which is now successfully in use, is shown by way of example, in the accompanying drawing, in which, Figure 1 is a perspective view of the marking signal shown resting in a vertical position on the flat tail end thereof;

Throughout the various figures of the drawing and the specification, like reference numerals refer to similar parts.

Figure 1:
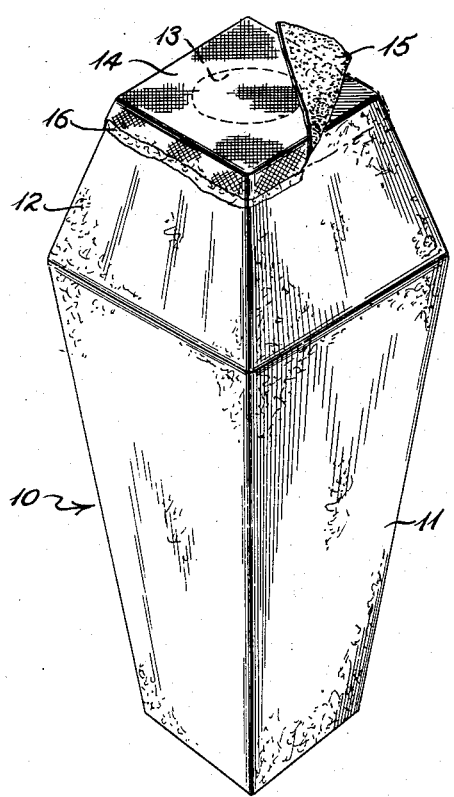

The drop signal or bomb is generally indicated at 10 and is comprised of a casing having a rear end portion 11 and a front portion 12 integrally and abuttingly connected thereto which is provided with a flat front end 14. Flat front end 14 is apertured as indicated at 13 so as to provide an access for filling the interior of the casing with a marking powder 17.

The marking powder 17 may be any suitable color and include bronze powder, fluoresceins and chrome yellow so treated as to remain suspended on the surface of the water and is of such a character that it will spread spontaneously on the surface of the water to form a coherent film. Marking signal 10 is filled with the powder 17 to a level such as indicated at 18 just below the filling aperture 13 thus providing a void space between the powder surface 18 and the casing permitting expansion and contraction of the powder.

The front end 14 of the front end 12 of the casing is provided with a powder filling and access aperture 13 that has a closure 15 which may be fabric porous material such as industrial tape. Tape 15 is stretched over the end 14 and secured to the front portion 12 by adhesive disposed intermediate the surface of the casing and the inner side of the tape. The closure 14 for aperture 13 is further held secure on the side walls of the front end 12 by a sealing compound 16 which is applied so as to overlap the edges of the fabric 14.

Figure 2:
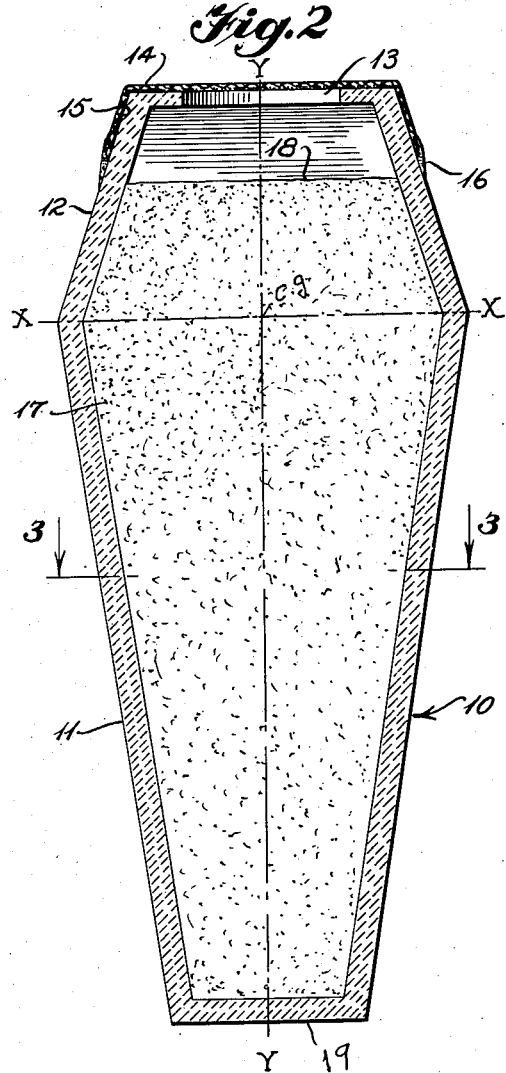
Figure 2 is a vertical cross section of the marking signal.
Figure 3:
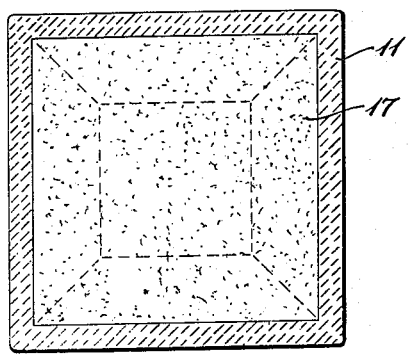
Figure 3 is a cross section as viewed along section line 3—3 in Figure 2.

In Figure 2 the elongated marking signal or casing 10 is shown with its longitudinal axis Y—Y extending therethrough and the shell portions 11 and 12 forming the rear and front portions respectively are symmetrically disposed about the longitudinal axis Y—Y. The rear portion 11 extends for about 75% of the whole length of the casing as measured along the major axis Y—Y while the front portion 12 extends for the balance of the length of the casing. The rear portion 11 has a flat tail end 19 and is of a shape of a frustum of a regular pyramid. The front portion 12 abuts the front end of the rear portion 11 in the plane X—X which is transverse to the major axis Y—Y. The front portion 12 extends oppositely from the rear portion 11 along the major axis Y—Y and has a shape of a frustum of a regular pyramid terminating in the flat front end 14 which is transverse to the major axis Y—Y. The amount of the area of the tail end 17 which is also transverse to the axis Y—Y is less than the amount of the area of the front end 14 and the front end 14 is of a lesser area than the area formed by a plane containing the minor axis X—X and lying as a juncture plane between the abutting rear portion 11 and the front portion 12.

In the particular form here shown each portion 11 and 12 is formed of four flat sides wherein the sides of the rear portion 11 diverge outwardly from the flat tail end 17 while the sides of the front portion 12 converge towards the front end 14. The inner surfaces of the sides forming the rear portion 11 and the front portion 12 are flat and smooth and provide for a surface against which the powder 17 will not pack or cake nor adhere but against which it flows freely. Thus, when the bomb is dropped and it bursts all of the powder is expelled from within and slides freely off of the sides and particles so that it is not carried below the surface of the water by the particles but is allowed to remain and float on the surface of the water.

It is possible that rear and front portions 11 and 12 may be made with more than four sides, however, the four sides here illustrated are preferred as they provide a shape for the casing which readily fractures on impact, particularly when dropped from relatively low altitudes at very low speeds of the airship or aircraft from which the signal is dropped.

The overall length of the actual example here shown is 7¼ inches and the maximum width along the minor axis X—X is of the order of 3¼ inches. The thickness of the cross section of the casing is of the order of ⅛ to $\frac{3}{16}$ of an inch. The material of which the casing may be made is an inorganic plastic composition which may be rendered liquid with heating to produce a readily flowable liquid mass. This composition contains a thermal plastic binder material and various fillers and pigments. Such a composition may be heated to liquefy it and it may thereupon be poured or cast in molds. When it is allowed to set, the composition solidifies to form a frangible and easily fracturable solid body. The composition per se, does not form a part of this invention and a detailed description thereof is not given. This drop signal may be easily stored and transported and will not disintegrate or fracture upon normal handling. The marking signal according to my invention may be dropped from exceedingly great heights such as 30,000 to 40,000 feet or from relatively low heights in the order of 10 to 15 feet and yet provides for a high fidelity of fracture on impact when dropped from either of such extreme high or low altitudes. This marking signal may be given relatively high initial velocity as with a simple catapult or even by means of hand throwing but it will not fracture until it strikes a surface onto which it is projected to leave a visible signal or mark.

In the particular example here shown the loaded marker has a center of gravity approximately falling at C. G. which approximately lies in the plane of juncture X—X between the rear portion 11 and the front portion 12 and along the major axis Y—Y. Thus, when this bomb is dropped it will orient itself so as to fall with the front end 12 downward. If it is dropped with its tail end 19 down it will flip one-half a turn so that it falls with its front end 14 as the leading end. The plurality of flat surfaces afford striking areas which on impact with the surface shatter or break the casing so that it spills out its contained powder 17. Since the interior surfaces of the flat sides are smooth and sloping, the powder 17 readily slides thereover and falls therefrom providing the maximum use of the powder for marking purposes.

It has been found that these marking signals are highly reliable for handling at both high and low altitudes and at great speeds and yet when dropped from either high or low altitudes onto a surface afford a high fidelity of breakage thus making them highly useful as a surface marking signal.

I claim as my invention:

1. A surface marking signal containing powder for marking purposes and adapted to burst upon impact comprising an elongated casing of frangible material with its major axis extending therethrough and comprising a rear portion and an abutting front portion, said rear portion extending for about 75% of the whole length of the casing as measured along said major axis while the front portion extends for the balance of the length of the casing, said rear portion having a shape of a frustum of a regular pyramid terminating in a flat tail end disposed transverse to said major axis, the flat tail end having an area smaller than the area of a juncture plane extending transverse to the major axis and disposed between said abutting rear and front portions, said front portion abutting said rear portion at said juncture plane and extending oppositely from said rear portion along the major axis and having a shape of a frustum of a regular pyramid terminating in a flat front end having an area of an amount intermediate the amount of the area of said flat tail end on the rear portion and the amount of the area of said juncture plane between said rear and front portions, said flat front end having a filling access aperture extending therethrough for inserting of marking powder, and a closure for said aperture of material porous to the passage of air but impervious to the passage of powder, whereby said casing will not be deformed or fractured when handled and due to changes in pressure such as will obtain in an aircraft as a result of sudden changes of altitude.

2. A surface marking signal according to claim 1 wherein said casing is molded of inorganic plastic composition.

3. A surface marking signal according to claim 1 wherein said powder is of a character that will spread spontaneously on the surface of water to form a coherent film.

4. A surface marking signal according to claim 1 wherein said closure for said aperture in the flat end of the front portion is a porous industrial tape which is secured to said front portion and over said aperture by adhesive, said fabric being porous to the passage of air but impervious to the passage of said marking powder.

5. A surface marking signal according to claim 1 wherein the rear and front portions having a shape of a regular pyramid each have four sides and the flat end tail of the rear portion, the juncture plane between the abutting portions and the flat end of the front portion having the filling aperture therein are of square configuration.

6. A surface marking signal according to claim 1 wherein said casing is molded of inorganic plastic composition, said powder is of a character that will spread spontaneously on the surface of water to form a coherent film upon bursting of said casing on impact, said closure for said aperture in the flat end of the front portion is a porous industrial tape which is secured to said front portion and over said aperture by adhesive, said fabric being porous to the passage of air but impervious to the passage of said marking powder, and said rear and front portions having a shape of a regular pyramid each have four sides and the flat end tail of the rear portion, the juncture plane between the abutting portions and the end of the front portion having the filling aperture therein are of square configuration.

7. A surface marking signal containing powder for marking purposes and adapted to burst upon impact including, in combination, an elongated casing of frangible material with its major axis extending therethrough and comprising a rear portion and an abutting front portion, said rear portion extending for about 75% of the whole length of the casing as measured along said major axis while the front portion extends for the balance of the length of the casing, said rear portion having a shape of a frustum of a regular pyramid terminating in a flat tail end disposed transverse to said major axis, the flat tail end having an area smaller than the area of a juncture extending transverse to the major axis and disposed between said abutting rear and front portions, said front portion abutting said rear portion at said juncture plane and extending oppositely from said rear portion along the major axis and having a shape of a frustum of a regular pyramid terminating in a flat front end having an area of an amount intermediate the amount of the area of said flat tail end on the rear portion and the amount of the area of said juncture plane between said rear and front portions, said flat front end having a filling access aperture extending therethrough for insertion of marking powder, said casing being filled with marking powder to an amount to provide a void space within the casing thereby permitting expansion and contraction of said powder and so that the center of gravity of said signal when in a position of rest on said flat tail end of the first portion lies substantially in the juncture plane between said abutting first and second portions and on said longitudinal axis, and a closure for said aperture of material porous to the passage of air but impervious to the passage of powder, whereby said casing will not be deformed or fractured when handled and due to changes in pressure such as will obtain in an aircraft as a result of sudden changes of altitude.

8. A surface marking signal containing powder for marking purposes and adapted to burst upon impact including, in combination, an elongated casing molded of inorganic plastic composition adapted to burst on impact such as when dropped from an altitude as low as about 15 feet having a plurality of flat sides joining with a flat surface at each end, one of said ends having a filling access aperture extending therethrough for insertion of marking powder, said casing being filled with marking powder to an amount to provide a void space within the casing thereby permitting expansion and contraction of said powder, the inside surface of each of said flat sides being flat and smooth whereby the powder does not pack or adhere thereagainst but readily flows thereover, said end having the filling aperture being larger in area than said other opposite end, the center of gravity of said signal being nearer said apertured end and a closure for said aperture in the end of a material porous to the passage of air but impervious to the passage of powder, whereby said casing will not be deformed or fractured when handled and due to changes in pressure such as will obtain in an aircraft as a result of sudden changes of altitude.

9. A surface marking signal according to claim 8 wherein the rear portion of said elongated casing has a shape of a frustum of a regular pyramid having its sides diverging outwardly from each other as they extend from the end thereof toward the other end and the front remaining portion has a shape of a frustum of a regular pyramid having its sides converging toward the adjacent end having the filling aperture and wherein the center of gravity of said signal lies approximately at the plane of juncture of said rear and front portions and on the longitudinal axis of said elongated casing.

10. A surface marking signal according to claim 9 wherein said closure for the apertured end is a porous industrial tape which is secured to said front portion and over said aperture by adhesive, said fabric being porous to the passage of air but impervious to the passage of said marking powder.

ROBERT O. LINCK.

References Cited in the file of this patent

UNITED STATES PATENTS

| Number | Name | Date |
|---|---|---|
| 1,124,768 | Lowry | Jan. 12, 1915 |
| 1,226,905 | Neumann | May 22, 1917 |
| 2,338,719 | Holt | Jan. 11, 1944 |
| 2,439,598 | Dinsley | Apr. 13, 1948 |
| 2,459,267 | Dwyer | Jan. 18, 1949 |
| 2,477,274 | Trecek | July 26, 1949 |